US008939409B2

(12) United States Patent  
Apland et al.

(10) Patent No.: US 8,939,409 B2  
(45) Date of Patent: Jan. 27, 2015

(54) ADAPTOR SYSTEM FOR DEPLOYING SMALL SATELLITES

(71) Applicant: The Johns Hopkins University, Baltimore, MD (US)

(72) Inventors: Clint T. Apland, Elkridge, MD (US); Aaron Q. Rogers, Silver Spring, MD (US); David F. Persons, Columbia, MD (US); Robert A. Summers, Dayton, MD (US)

(73) Assignee: The Johns Hopkins University, Baltimore, MD (US)

( * ) Notice: Subject to any disclaimer, the term of this patent is extended or adjusted under 35 U.S.C. 154(b) by 328 days.

(21) Appl. No.: 13/887,423

(22) Filed: May 6, 2013

(65) Prior Publication Data

US 2014/0131521 A1    May 15, 2014

Related U.S. Application Data

(60) Provisional application No. 61/643,460, filed on May 7, 2012.

(51) Int. Cl.
*B64G 1/44* (2006.01)
*B64G 1/64* (2006.01)

(52) U.S. Cl.
CPC ...................................... *B64G 1/645* (2013.01)
USPC ................... 244/173.3; 244/173.2; 244/173.1

(58) Field of Classification Search
USPC ................................ 244/173.3, 173.2, 173.1
See application file for complete search history.

(56) References Cited

U.S. PATENT DOCUMENTS

| | | | |
|---|---|---|---|
| 3,529,417 A | 9/1970 | Knight | |
| 4,771,971 A | 9/1988 | Ludwig et al. | |
| 5,050,821 A | 9/1991 | Kerstein et al. | |
| 5,613,653 A | 3/1997 | Bombled et al. | |
| 5,702,069 A * | 12/1997 | Geyer et al. | 244/173.3 |
| 5,755,407 A | 5/1998 | Aubret et al. | |
| 5,848,766 A | 12/1998 | Thompson | |
| 5,860,624 A | 1/1999 | Obry et al. | |
| 6,126,115 A * | 10/2000 | Carrier et al. | 244/173.3 |
| 6,276,639 B1 | 8/2001 | Hornung et al. | |
| 6,296,206 B1 | 10/2001 | Chamness et al. | |
| 6,494,406 B1 | 12/2002 | Fukushima et al. | |
| 6,695,261 B2 | 2/2004 | Cleveland | |
| 6,776,375 B1 | 8/2004 | Engelhardt et al. | |
| 6,869,048 B2 | 3/2005 | Draisey et al. | |
| 6,905,097 B2 | 6/2005 | Blackwell-Thompson et al. | |
| 7,036,773 B2 | 5/2006 | Caldwell | |
| 7,370,835 B2 | 5/2008 | Kistler et al. | |
| 7,644,891 B2 * | 1/2010 | Aston et al. | 244/173.3 |

(Continued)

*Primary Examiner* — J. Woodow Eldred
(74) *Attorney, Agent, or Firm* — Noah J. Hayward (57) ABSTRACT

An adaptor system includes a space vehicle separation plate operably coupled to a space vehicle, a launch vehicle adaptor plate operably coupled to a launch vehicle capable of carrying the space vehicle into space for release of the space vehicle from the launch vehicle, an actuator release mechanism assembly, a bend/shear restrain assembly that is non-coaxial with the actuator-release connector, and a biasing element. The actuator-release mechanism assembly may be configured to separably couple the space vehicle separation plate to the launch vehicle adaptor plate. The actuator-release mechanism assembly may pass through the launch vehicle adaptor plate to engage the space vehicle separation plate to hold the space vehicle separation plate substantially parallel to the launch vehicle adaptor plate prior to release of the space vehicle separation plate.

19 Claims, 11 Drawing Sheets

(56) References Cited

U.S. PATENT DOCUMENTS

| | | | |
|---|---|---|---|
| 7,861,976 B2 * | 1/2011 | Holemans | 244/173.3 |
| 7,866,607 B2 | 1/2011 | Benedict | |
| 7,931,237 B2 | 4/2011 | Penzo | |
| 8,789,797 B2 * | 7/2014 | Darooka | 244/173.1 |
| 2005/0230562 A1 | 10/2005 | Buehler | |

* cited by examiner

ADAPTOR SYSTEM FOR DEPLOYING SMALL SATELLITES

CROSS-REFERENCE TO RELATED APPLICATIONS

This application claims priority to and the benefit of U.S. Provisional Application Ser. No. 61/643,460 filed on May 7, 2012, the entire contents of which are hereby incorporated herein by reference.

TECHNICAL FIELD

Example embodiments generally relate to satellites that are deployable from launch vehicles and, more particularly, relate to an adaptor that is useable in connection with various different launch vehicles for facilitating satellite deployment.

BACKGROUND

There are many different launch vehicles that are capable of taking payloads into space either for orbital insertion or on a ballistic re-entry trajectory into Earth atmosphere. For example, Dnepr, Soyuz, Vega, Minotaur I, Minotaur IV, Falcon 1e, Falcon 9, Falcon Heavy, Delta IV, Atlas V, Ariane 5, Taurus, Antares, PSLV, Super Strypi, Pegasus, ALASA, SWORDS and Athena IIc are examples of such launch vehicles (LVs). These LVs each represent different structures with different capabilities in terms of the payloads they can deliver. Moreover, after carrying a payload such as a satellite into space, the satellite must be released from the LV into space, often using some form of deployment system with releasable actuator.

Releasable actuators can be used to selectively hold parts together. Upon receipt of a signal, the releasable actuator may operate to release the parts. When such release is conducted to separate a space vehicle (SV) such as a satellite from an LV or a re-entry body from a hypersonic vehicle or ballistic trajectory sounding rocket, it is not only important that the release can be conducted in a safe, consistent, and predictable fashion, but also that both the LV and the SV can be sure that the release has been conducted. Accordingly, the provision of some form of LV adaptor deployment system that can facilitate safe and reliable SV release from the LV may be desired.

Currently, adaptor structures tend to be complex and costly. Moreover, such adaptor systems are typically configured such that they can only be used with a limited number of LVs (or even just one). A typical adaptor system may include at least one piece that stays with the LV and another piece that is separated and stays with the SV. However, in connection with this structure, the components of the SV are often exposed to both visual inspection and potential damage, as well as possibly able to cause damage to other elements of the LV or other SVs. Furthermore, the piece that is separated to stay with the SV is an extra component that attached to the SV and therefore increases the cost of the adaptor.

BRIEF SUMMARY

Accordingly, some example embodiments may enable the provision of an adaptor system that is relatively simple and reliable, but also provide many advantages over existing adaptor solutions. In this regard, some example embodiments may provide for simplicity of integration with a unique structure. Some example embodiments may employ a two part adaptor structure including a dispenser plate that stays with the LV and a mounting plate that flies away with the SV when separation is initiated. The dispenser plate may, in some cases, also be fitted with a shroud that may serve to improve the safety and security of the SV, other SVs, and the LV.

In one example embodiment, an adaptor system is provided. The adaptor system may include a space vehicle separation plate operably coupled to a space vehicle, a launch vehicle adaptor plate operably coupled to a launch vehicle capable of carrying the space vehicle into space or into a ballistic (non-orbital) trajectory for release of the space vehicle from the launch vehicle, an actuator release mechanism assembly, a bend/shear restraint assembly that is non-coaxial with the actuator-release mechanism, and a biasing element. The actuator-release mechanism assembly may be configured to separably couple the space vehicle separation plate to the launch vehicle adaptor plate. The actuator-release mechanism assembly may pass through the launch vehicle adaptor plate to engage the space vehicle separation plate to hold the space vehicle separation plate substantially parallel to the launch vehicle adaptor plate prior to release of the space vehicle separation plate. The bend/shear restraint assembly may be configured to handle in-plane load while releasably coupling the space vehicle separation plate to the launch vehicle adaptor plate. The biasing element assembly may be configured to provide a configurable force normal to a surface of the launch vehicle adaptor plate to separate the space vehicle separation plate from the launch vehicle adaptor plate when the actuator-release mechanism assembly is triggered to release the space vehicle separation plate from the launch vehicle adaptor plate. In some cases, the described adaptor system and optional shroud provide a unique, low-cost, flexible, reliable means for integrating space vehicles with launch vehicles for transport and deployment. This same adaptor system may be similarly configured for use by space vehicles placed into a re-entry trajectory into Earth's atmosphere by a launch vehicle, sounding rocket, or other ballistic delivery system.

BRIEF DESCRIPTION OF THE SEVERAL VIEWS OF THE DRAWING(S)

Having thus described some example embodiments of the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

Some example embodiments may provide for more optimal utilization of excess LV secondary payload rideshare accommodation capability. In this regard, for example, the provision of a scalable and standardized small satellite adaptor may enable participation in or provision of lower cost missions. Moreover, such an adaptor may also provide more flexible and capable SVs, such as the SV 110 to be provided based on mass, volume and form-factor constraints. For example, such an adaptor could enable the launch of SVs with more ready-use of commercial, off-the-shelf (COTS) components and technologies, or include enabling capabilities such as propulsion for orbital repositioning or ballistic trajectory corrections of the SV after deployment from the LV. Example embodiments may therefore provide a hard-point mount and a release mechanism with an optional SV enclosure shroud to simplify the use of secondary launch opportunities by fitting all of the various secondary payload locations and bridging gaps between different vehicle interfaces. In all cases, however, the described adaptor system and optional shroud can be utilized to support primary and dedicated launch of SVs.

Figure 1:
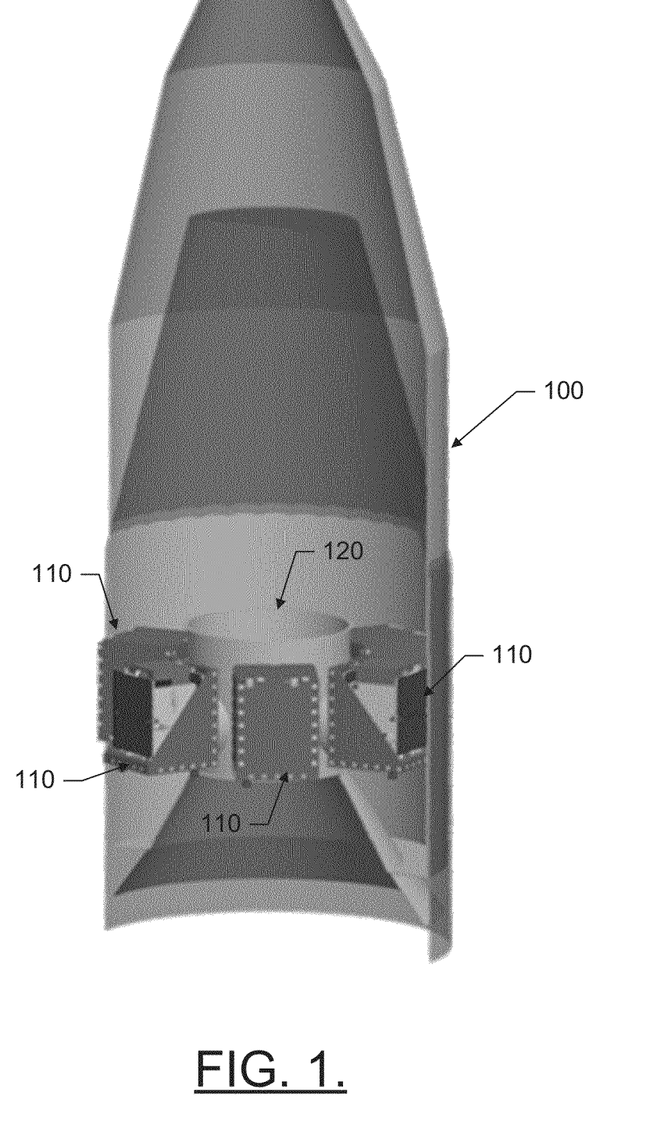
FIG. 1 illustrates an example of an LV incorporating a plurality of SVs in accordance with an example embodiment.

FIG. 1 illustrates an example of an LV 100 incorporating a plurality of SVs 110 in accordance with an example embodiment. As can be appreciated from FIG. 1, the SVs 110 can be arranged to be supported from exterior edges of a support structure 120 via an adaptor system of an example embodiment. However, it should further be appreciated that one or more SVs 110 could be supported inside the support structure 120 as well, or on a flat table or plate, instead of being supported around external edges of a cylindrical structure such as that which is shown in FIG. 1. In any case, the adaptor system may incorporate one portion that remains attached to the support structure 120 of the LV 100 and one piece that flies away with the SV 110 responsive to release of the SV 110. Moreover, in some embodiments, the piece that flies away with the SV 110 may be an integral part of the SV 110. In any case, the manner by which the SV is attached to the LV using the adaptor, and the relative orientation in which it is deployed, is completely configurable.

Figure 2:
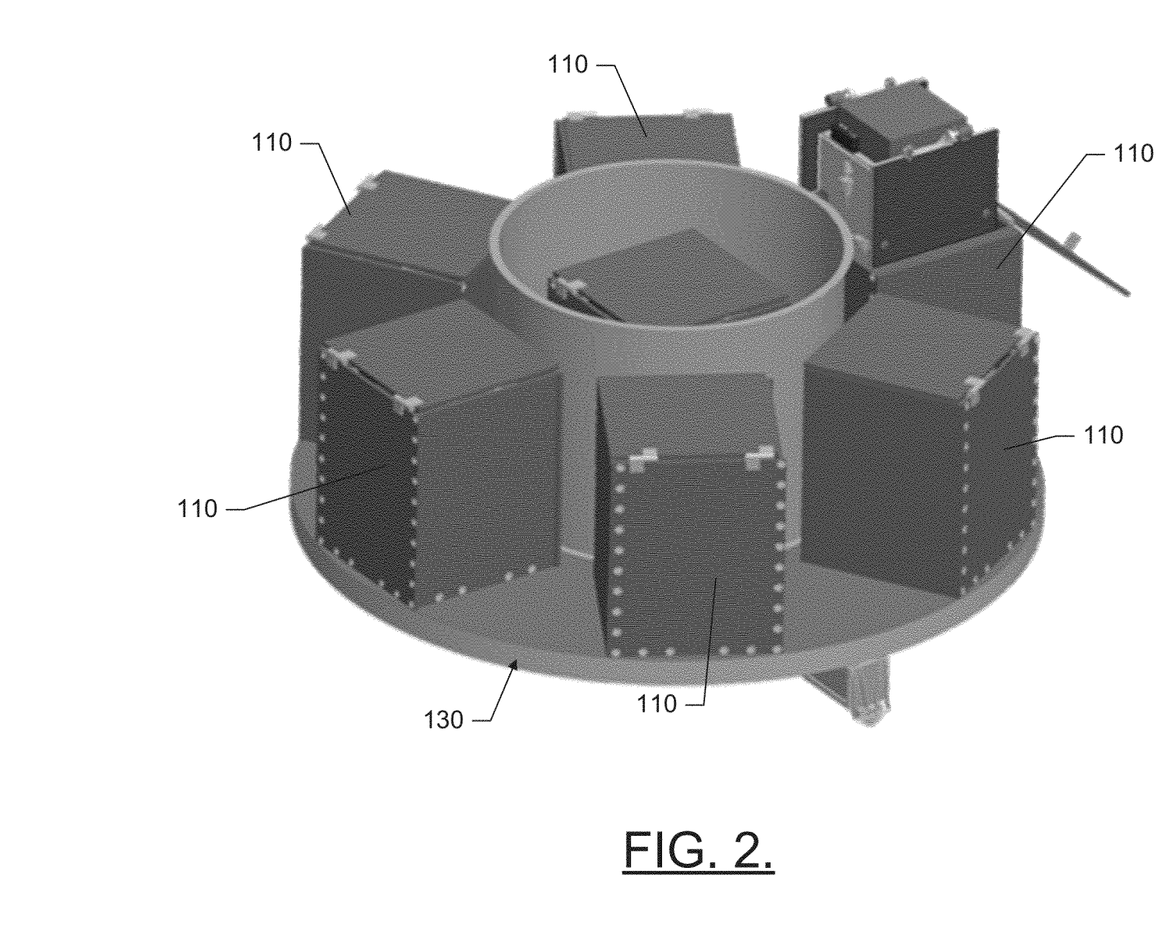
FIG. 2 illustrates a perspective view of an example arrangement utilizing a flat plate support structure according to an example embodiment.

Although the example of FIG. 1 shows a Minotaur IV and Athena IIc accommodation, it should be appreciated that example embodiments are also scalable and useable in connection with other systems as well. In this regard, example embodiments of a system of launch vehicle adaptor structures may enable the separation system to be implemented on other numerous launch vehicles such as, for example, Dnepr, Soyuz, Minotaur I, Falcon 1e, Falcon 9, Falcon Heavy, Delta IV, Atlas V, Ariane 5, Taurus, Antares, PSLV, Pegasus, ALASA, Super Strypi, and SWORDS. Moreover, adaptor support structures that may be employed could include the cylindrical adaptor support structure with radial ports that is shown in FIG. 1, or flat plate structures in which the SVs 110 sit on a flat plate support structure such as support structure 130 shown in FIG. 2. As can be appreciated from FIGS. 1 and 2, all, some or none of the SVs 110 may employ a shroud or a partial shroud as will be described in greater detail below.

The flat plate adaptors of some examples may be circular and built in four typical, but not exhaustive, diameters (38", 60", 78", and 108"). The 38" diameter flat plate adaptor can be accommodated inside the adaptor rings which may be features of Minotaur I, Minotaur IV, Falcon 1e, Taurus, Antares, Super Strypi, Athena IIc and SWORDS launch vehicles. The 60" diameter flat plate adaptor can be accommodated inside the 60" adaptor rings of LVs such as the Minotaur IV, Antares, Delta IV, Atlas V, Falcon 9, and Falcon launch vehicles. The 78" diameter flat plate adaptor can be attached to a 38" adaptor ring, and can be accommodated inside the fairings of LVs such as Minotaur IV, Taurus, Antares, Athena IIc and larger launch vehicles. The 108" diameter flat plate adaptor can be attached to the 60" diameter adaptor rings of and fit inside the fairings of LVs such as Dnepr, Antares, PSLV, Delta IV, Atlas V, Falcon 9, and Falcon Heavy launch vehicles. When used in conjunction with one or more Small Launch EELV Secondary Payload Adapter (ESPA) rings or similar cylindrical adaptors with radial ports, a mixed topology of small satellites can be configured, including CubeSats (1U through 6U and beyond), nanosatellites, microsatellites, ESPA-class small satellites, and other larger payloads, on launch vehicles such as the Minotaur IV and Athena IIc launch vehicles. When used in conjunction with one or more ESPA or ESPA Grande rings or similar cylindrical adaptors with radial ports, a mixed topology of small satellites can be configured, including CubeSats (1U through 6U and beyond), nanosatellites, microsatellites, ESPA-class small satellites, and other larger payloads, on launch vehicles such as the Antares, PSLV, Delta IV, Atlas V, Falcon 9 or Falcon Heavy.

Small Launch ESPA, ESPA, ESPA Grande, or other similar cylindrical adaptors with radial ports, can be used to support a mixed topology of small satellites, including CubeSats, nanosatellites, microsatellites, ESPA-class small satellites, and other larger payloads on launch vehicles such as, Dnepr, Antares, PSLV, and larger (Atlas, Delta, Falcon 9 or Heavy) launch vehicles. When cylindrical ported adaptors are used, the shroud can be utilized as an intermediary, which serves as a load path between the small satellites and the launch vehicle, to permit deployment of the SV in any permissible orientation.

Example embodiments may provide a flat plate adaptor system that may be configured to enable mixed topology launches of small satellites, including CubeSats (1U through 6U), nanosatellites, microsatellites, ESPA-class small satellites, and other larger payloads in many combinations of primary, secondary, and tertiary designation mixture. The modular nature of example embodiments described herein may maximize area and volume that is available to accommodate the payloads of the space vehicles that are separable from launch vehicles using example embodiments. Example embodiments may also provide significant flexibility in component accommodations relative to canisterized systems such as X-POD, P-POD, ISIS-POD, J-POD, EZ-POD, NLAS, CSD, and/or the like.

Figure 3:
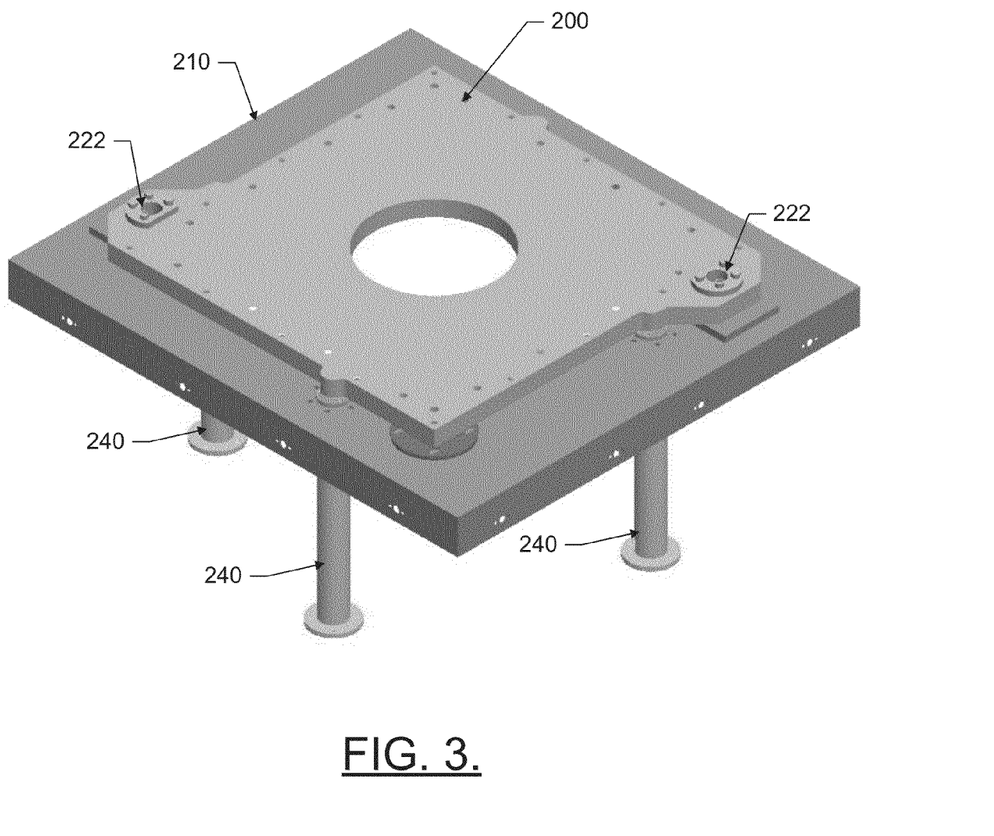
FIG. 3 illustrates a top perspective view of one example arrangement of an adaptor system in accordance with an example embodiment.
Figure 4:
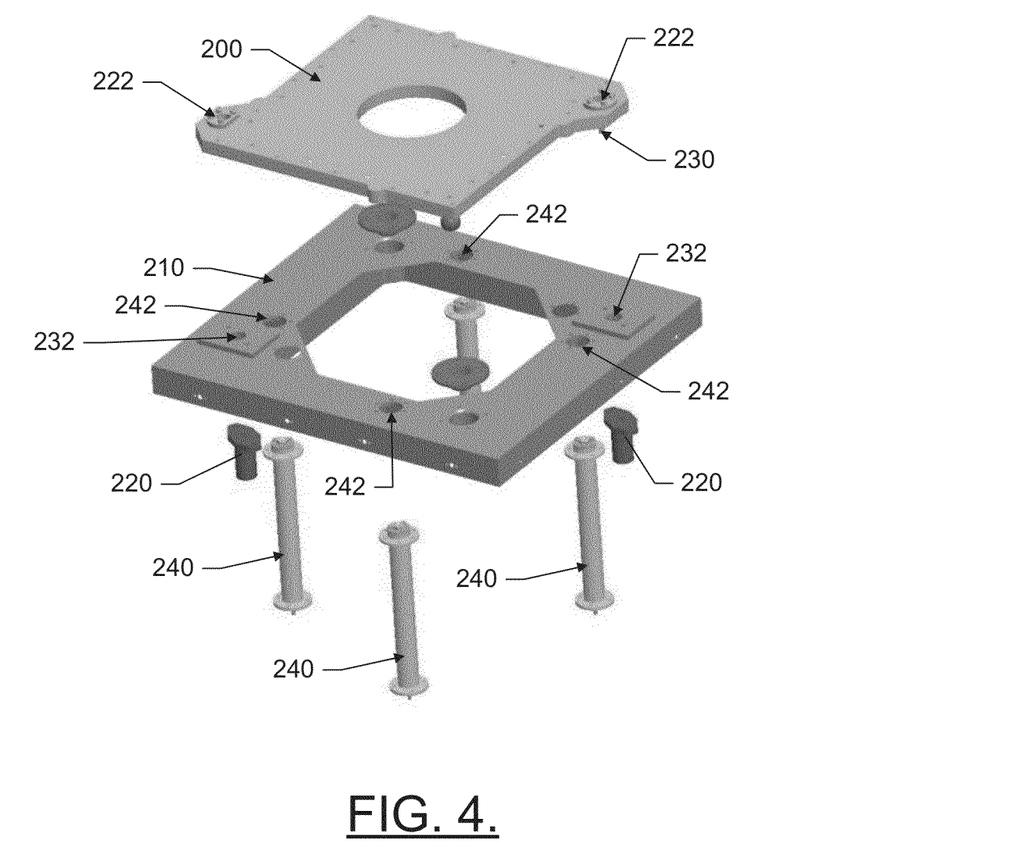
FIG. 4 illustrates an exploded, top perspective view of one example arrangement of the adaptor system in accordance with an example embodiment.
Figure 5:
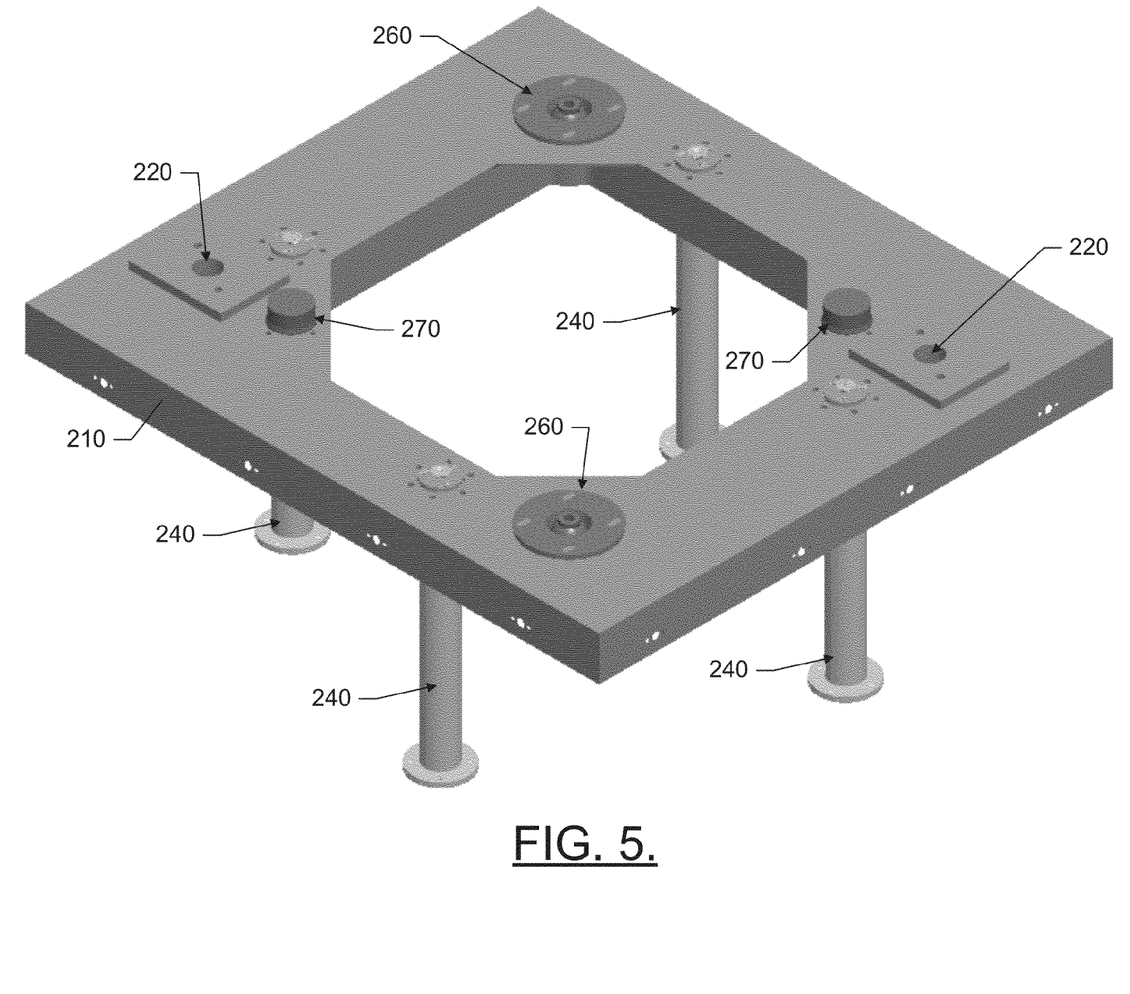
FIG. 5 illustrates a top perspective view of one example arrangement of the LV adaptor plate of an example embodiment.
Figure 6:
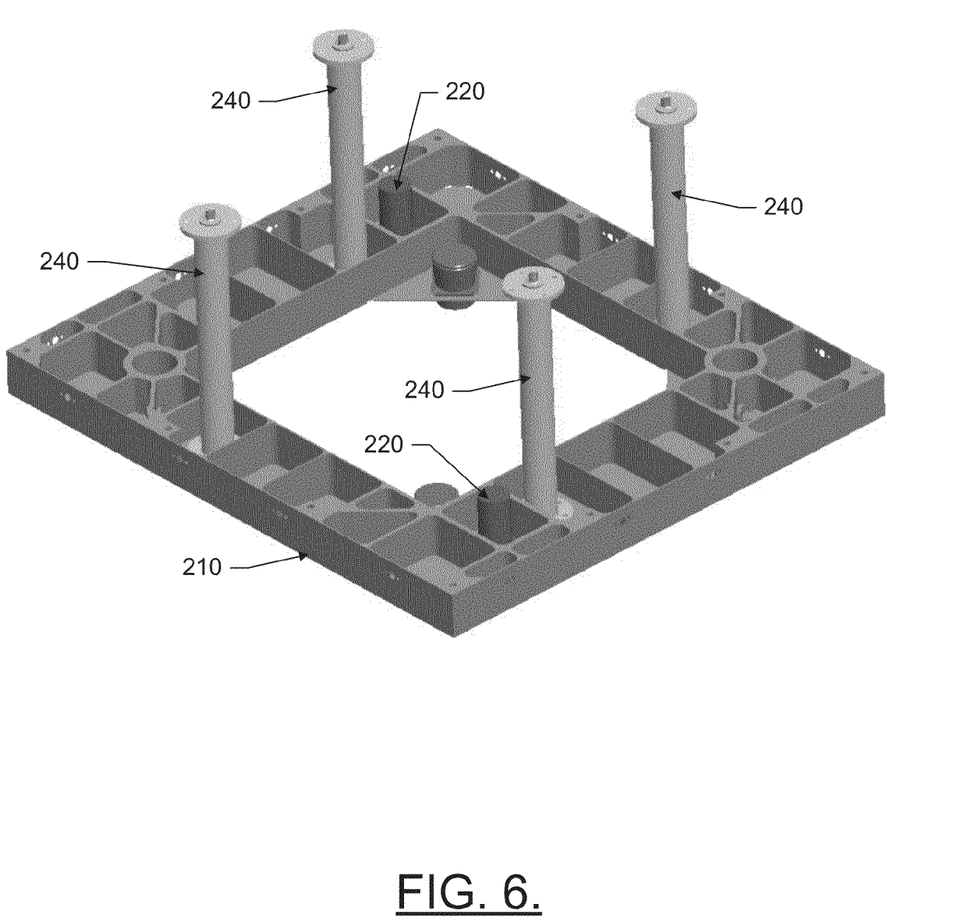
FIG. 6 illustrates a bottom perspective view of the LV adaptor plate 210 of an example embodiment.
Figure 7:
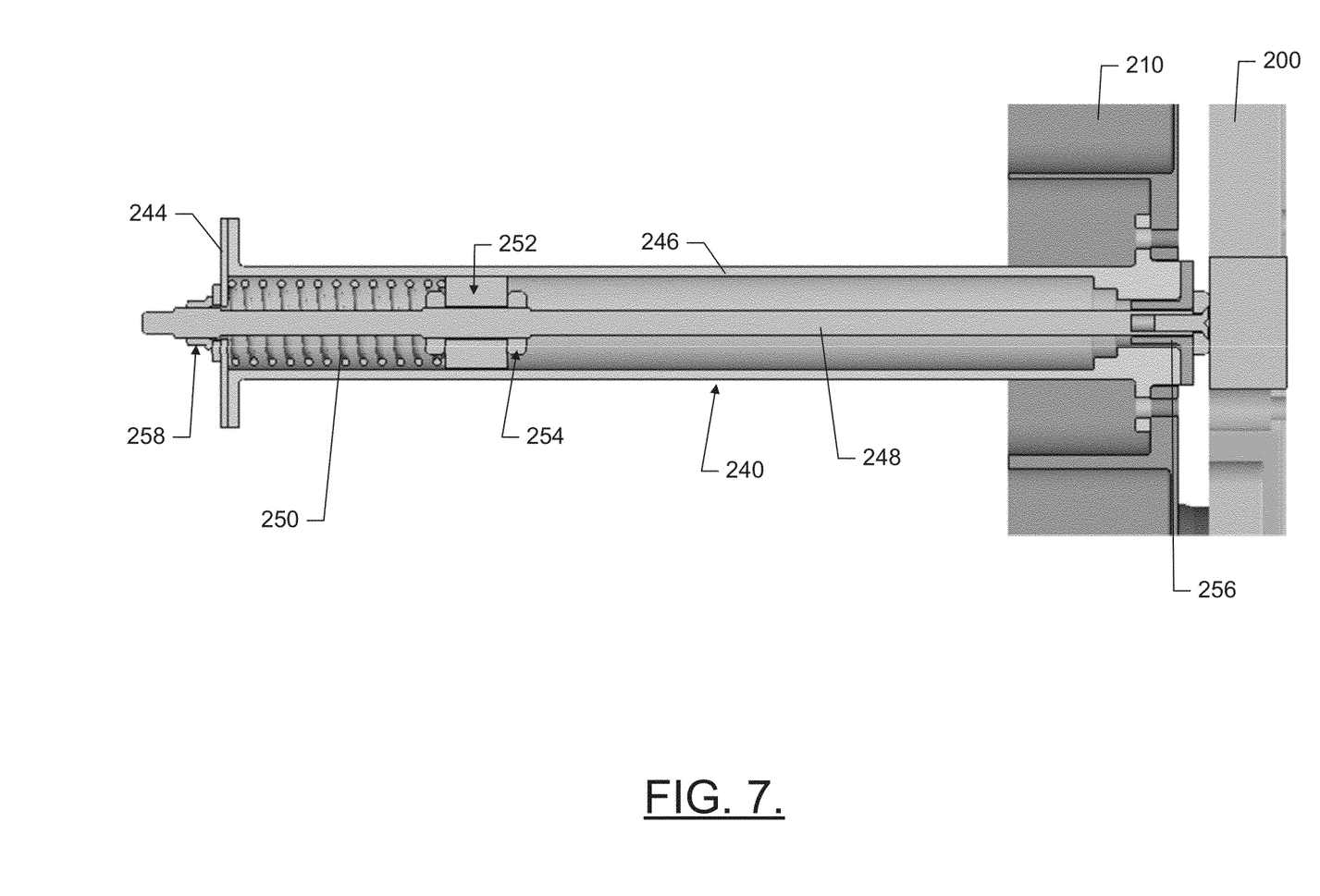
FIG. 7 is a detailed cross sectional view taken along a longitudinal centerline of a separation spring assembly of an example embodiment.
Figure 8:
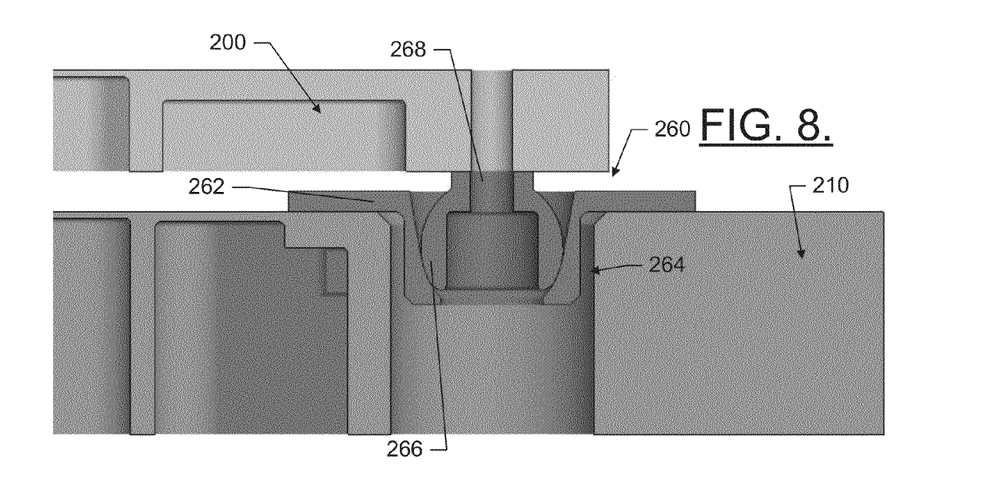
FIG. 8 is a detailed cross sectional view taken along a longitudinal centerline of a bend/shear retainer of an example embodiment.
Figure 9:
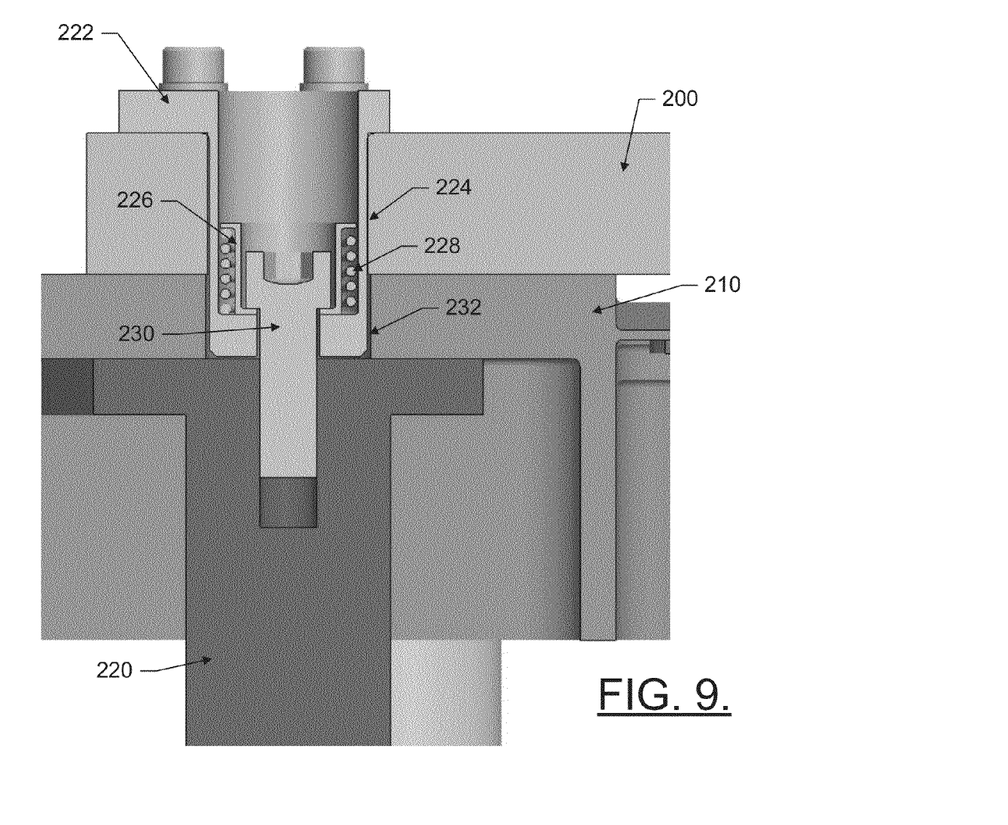
FIG. 9 illustrates a detailed cross sectional view taken along a longitudinal centerline of an actuator-release mechanism of an example embodiment.

As indicated above, the adaptor system of an example embodiment includes one portion that remains attached to the support structure 120 of the LV 100 and one piece that flies away with the SV 110 responsive to release of the SV 110. FIG. 3 illustrates a top perspective view of one example arrangement of an adaptor system in accordance with an example embodiment. FIG. 4 illustrates an exploded, top perspective view of the adaptor system in accordance with an example embodiment. FIG. 5 illustrates a top perspective view of the LV adaptor plate of an example embodiment. FIG. 6 illustrates a bottom perspective view of the LV adaptor plate 210 of an example embodiment. FIG. 7 is a detailed cross sectional view taken along a longitudinal centerline of a separation spring assembly of an example embodiment. FIG. 8 is a detailed cross sectional view taken along a longitudinal centerline of a bend/shear retainer of an example embodiment. FIG. 9 illustrates a detailed cross sectional view taken along a longitudinal centerline of an actuator-release mechanism of an example embodiment.

Referring now to FIGS. 3 to 9, an example embodiment of the adaptor system will be described for purposes of explaining one example structure that may be employed in implementation of example embodiments. In this regard, the adaptor system of an example embodiment may include an SV separation plate 200 operably coupled to an LV adaptor plate 210. In this example, the LV adaptor plate 210 is one example of a structure for the portion that remains attached to the support structure 120 of the LV 100. Meanwhile, the SV separation plate 200 is one example of a structure for the piece that flies away with the SV 110 responsive to release of the SV 110. In some cases, as will be seen below, the LV adaptor plate 210 may further be fitted with a shroud that may enclose or partially enclose the small satellite such as SV 110. An embodiment including the shroud will be described in reference to FIGS. 10 to 13 below.

The LV adaptor plate 210 and the SV separation plate 200 may each be substantially flat plates that may be machined, cast, or produced by any other suitable method. The LV adaptor plate 210 and the SV separation plate 200 may each be substantially rectangular in shape, although other shapes could be employed, if desired. The length and width dimensions of the LV adaptor plate 210 and the SV separation plate 200 defining the planar faces of each plate may be substantially larger than the height dimension of each plate (e.g., the dimension defining the distance between the respective planar faces of LV adaptor plate 210 and the respective planar faces of the SV separation plate 200). In an example embodiment, the LV adaptor plate 210 may be larger with respect to each dimension than the SV separation plate 200. As can be seen in FIGS. 3-6, the LV adaptor plate 210 and the SV separation plate 200 may each have an opening defined at a center portion thereof, as a result of the employment of 220 and 260. Thus, when the LV adaptor plate 210 and the SV separation plate 200 are mated together, the openings in each plate may be substantially overlapping. The openings may provide access to components or circuitry in some embodiments. The separating half of the separation system (i.e., the SV separation plate 200) may therefore also serve as the bottom baseplate structure of the SV 110 for either integrity or mass savings purposes. Thus, the SV separation plate 200 may include bolt holes for the separation nuts 220 and features for attaching convex spherical snubbers 260, as well as features for attaching the space vehicle-side umbilical connectors 270, all within the shroud 300.

Mating of the LV adaptor plate 210 and the SV separation plate 200 may be employed to cause the SV 110 to be fixed to the LV 100 until the SV 110 is released. The mating components that affix the LV adaptor plate 210 to the SV separation plate 200 may provide for reliable connection of the LV adaptor plate 210 to the SV separation plate 200 prior to release, safe and reliable release, and accurate indication of pre-release and post-release statuses. To accomplish this, the mating components may employ at least one actuator-release mechanism that is configured to securely couple the LV adaptor plate 210 and the SV separation plate 200 until a separation signal is provided thereto. After receipt of the separation signal, the actuator-release mechanism may be configured to release the SV separation plate 200 from the LV adaptor plate 210.

Although the LV adaptor plate 210 and the SV separation plate 200 may no longer be held in contact with each other after the separation signal is released due to the operation of the actuator-release mechanism, guidance and facilitation of the release may still be desirable to ensure that the LV adaptor plate 210 and the SV separation plate 200 separate from each other in a safe and relatively controlled manner. Accordingly, in some embodiments, at least one biasing element may further be provided to push or urge the SV separation plate 200 away from the LV adaptor plate 210 after the separation signal is received. Although it may be possible to configure a system in which the push is only initiated after or responsive to the separation signal, the biasing element may provide for a simpler construction in which the biasing force is always present and, responsive to a release of the SV separation plate 200 from the LV adaptor plate 210, the biasing element may already be poised and ready to provide a force to push the SV separation plate 200 away from the LV adaptor plate 210. In an example embodiment, multiple biasing elements may be distributed at even distances from each other to provide a consistently applied separation force.

In some cases, a single actuator-release mechanism could be employed. In such an embodiment, it may be preferable to avoid usage of any openings so that the single actuator-release mechanism can be placed in the center of the LV adaptor plate 210 and the SV separation plate 200 to avoid introduction of any rotational movement of the SV 110 during separation. However, for rectangular shaped plates with openings in the centers thereof, multiple actuator-release mechanisms may be employed. Although it may be possible to include, for example, one actuator-release mechanism at or in correspondence with each corner of the SV separation plate 200, it may be desirable to avoid using four such mechanisms in light of the cost and complexity of such devices. Thus, in some embodiments, only two actuator release mechanisms disposed at or in correspondence with opposite corners of the SV separation plate 200 may be employed in order to reduce the total number of actuator-release mechanisms. However, to reduce the amount of preload in the actuator-release mechanisms required to restrain the SV against launch loads in the interface plane, some embodiments may employ one or more bend/shear restraints. In an example embodiment, the bend/shear restraint(s) may handle axial, in-plane loads to reduce the required preload between 200 and 210 to restrain the 200, and any resulting shock load when the SV separation plate 200 is released. Thus, for example, the bend/shear restraint(s) may be configured to handle in-plane load while releasably coupling the SV separation plate 200 to the LV adaptor plate 210 using axial adjustments to tailor the preload. In some cases, where multiple actuator-release mechanisms would otherwise be employed, example embodiments may replace one or more of the actuator-release mechanisms with corresponding bend/shear restraints to reduce cost and still provide a reliable assembly for separation. An additional benefit of the bend/shear restraint(s) is that the reduced preload in the actuator-release mechanisms results in reduced shock generated during the separation event. Example embodiments may also have relatively fewer separation points so that less timing synchronicity issues may be presented, and there is therefore less likelihood of tip off or spin inducement during separation.

In an example embodiment, the actuator-release mechanisms may be embodied as or otherwise include separation nuts 220. The separation nuts 220 may be a portion of an assembly including a shear sleeve 222 that may pass through a separation bolt opening 224 in the SV separation plate 200. The shear sleeve 222 may be configured to receive a spring cup 226 and an extraction spring 228 that may combine to ensure that a separation bolt 230 completely disengages when the separation nut 220 is activated. The separation bolt 230 may extend through the shear sleeve 222 engaging the spring cup 226 to draw the separation bolt 230 toward the separation nut 220. When an electronic separation signal is received, to the actuator-release mechanism may disengage the separation bolt 230 from the separation nut 220 so that the SV separation plate 200 is enabled to separate from the LV adapter plate 210. The separation nut 220 may extend through a separation nut receiver 232 opening formed in the LV adaptor plate 210. The separation nut receiver 232 and the separation nut opening 224 may be substantially aligned with each other prior to disengagement of the separation nut 220.

As indicated above, the separation of the SV separation plate 200 from the LV adapter plate 210 may be aided by the biasing element. In an example embodiment, the biasing element may be embodied as one or more separation springs 240. The separation springs 240 may extend through a separation spring receiving opening 242 formed in the LV adaptor plate 210 in a direction that is normal to a surface of the LV adaptor plate 210. In an example embodiment, four separation springs 240 may be provided spaced apart from each other equidistant from each other and distributed over the surface of the LV adaptor plate 210 to push the SV separation plate 200 away from the LV adaptor plate 210 after the separation nut 220 is released.

As shown in FIG. 7, the separation springs 240 may include a bottom plate 244 and a tube 246 that house a rod 248 and a spring 250. The bottom plate 244 may be coupled to the LV 100 via any suitable fixing means (e.g., one or more nuts, bolts, weld joints, and/or the like). The spring 250 may be biased against the bottom plate 244 to exert a force on the rod 248 in a direction away from the bottom plate 244. A lower bushing 252 may couple the rod to the spring 250 and a locating nut 254 may position the rod 248 proximate to the lower bushing 252 to pass the force through the rod 248 onto an upper bushing assembly 256 that may push against the SV separation plate 200. A retaining screw and safety nut 258 may couple the bottom plate 244 to the rod 248 as a temporary safety device. The safety nut 258 is removed before launch. Although FIGS. 3-6 and 10 show an example in which four separation springs are provided, it should be appreciated that less or more separation springs could be employed in alternative embodiments.

In an example embodiment, the bend/shear restraints may be embodied as one or concave spherical snubbers 260 (e.g., one elongated, one spherical), which may be configured to react to loads in the plane of the separation system. The snubbers 260 may include a socket 262 that may fit within a snubber reception opening 264 in a surface of the LV adaptor plate 210 that faces the SV separation plate 200. The socket 262 may receive a spherical snubber body 266 that may be coupled to the SV separation plate 200 via an elongated snubber body 268 that extends from the SV separation plate 200. Although FIGS. 4, 5 and 10 illustrate an example in which two snubbers 260 are provided (proximate to opposite corners of the LV adaptor plate 210), it should be appreciated that some embodiments could use only one snubber or more than two snubbers (e.g., four snubbers—one in each corner).

In an example embodiment, one or more separation umbilical connectors 270 may also be provided to indicate when the separation has occurred. The umbilical connectors 270 may include pins that, when disconnected from each other during a separation event, create an open circuit so that both the SV and the LV can know reliably that separation has occurred. Thus, for example, the separation system functions to provide reliable separation from the launch vehicle, and corresponding reliable indication of the same. False alarms may be prevented, and safe and reliable separation may also be achieved using example embodiments. Moreover, some embodiments may further include a connector for provision of power and telemetry services to the SV by the LV. The umbilical connector 270 may also provide for SV power, battery charging, and SV telemetry connections to the SV while the SV and LV are still on the ground. The functions of the umbilical connector may also be provided through wireless techniques and devices for the purpose of functional redundancy or if the physical interface is not desired.

Figure 10:
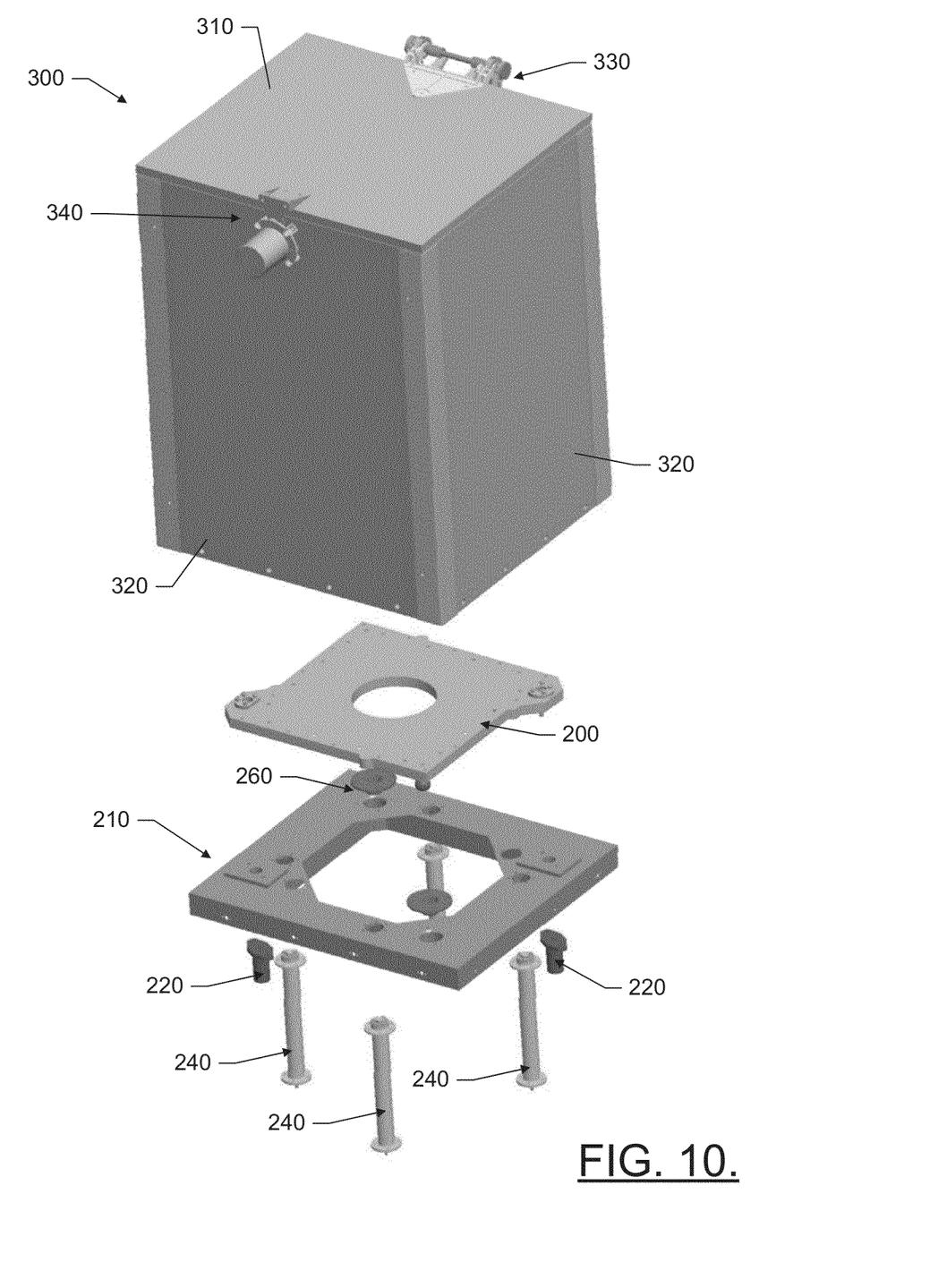
FIG. 10 illustrates an exploded perspective view of an optional shroud that may be attached to the LV adaptor plate of an example embodiment.
Figure 11:
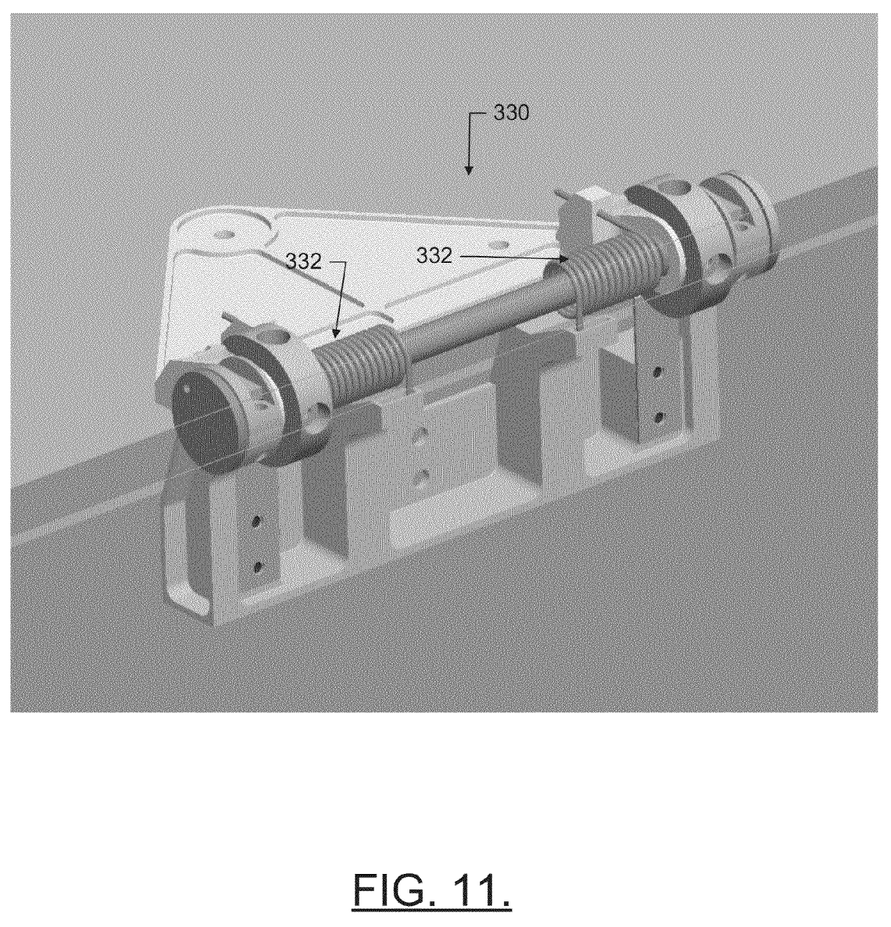
FIG. 11 illustrates a detail perspective view of a hinge employed on the shroud in accordance with an example embodiment.
Figure 12:
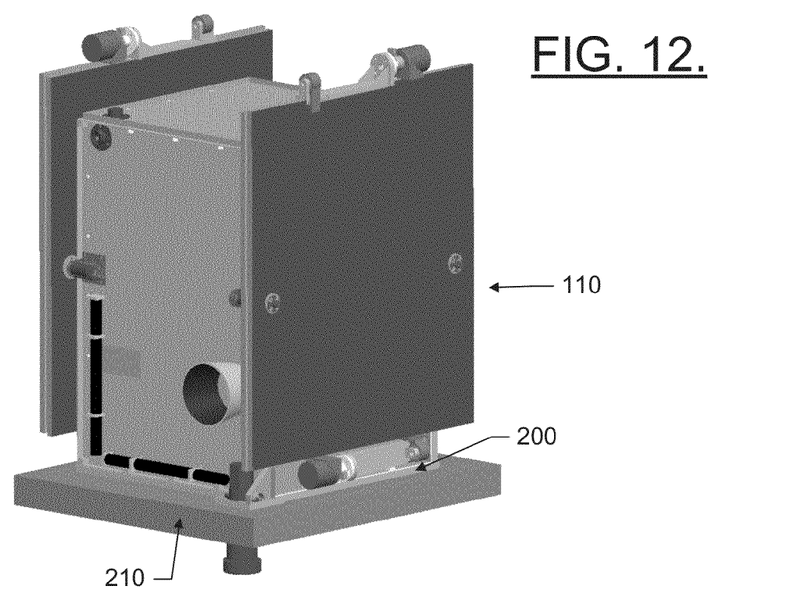
FIG. 12 illustrates a perspective view of an example SV that does not include a shroud in accordance with an example embodiment.
Figure 13:
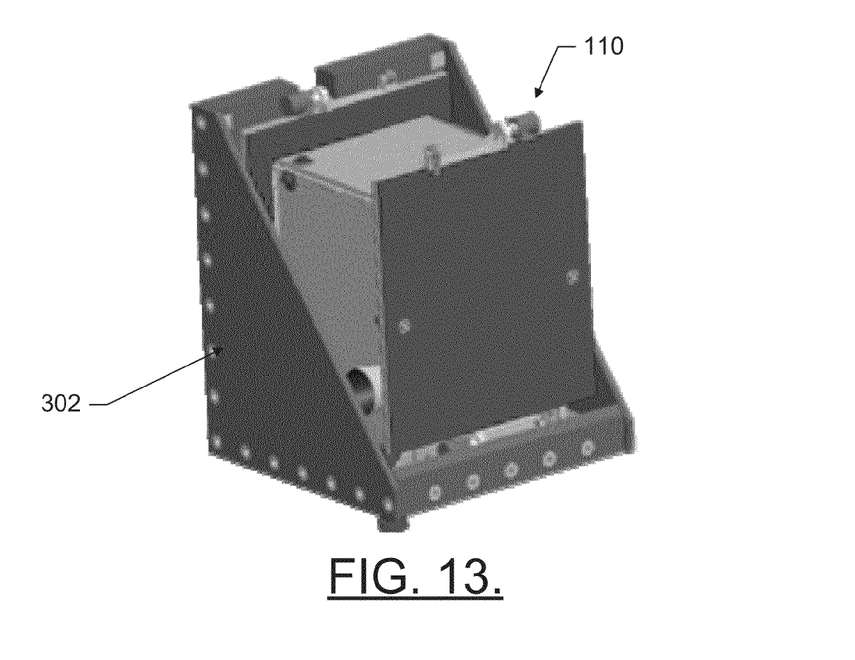
FIG. 13 illustrates an example SV in which a partial shroud is provided to serve as an intermediary secondary structural interface with the LV to orient the SV in accordance with an example embodiment.

FIG. 10 illustrates an exploded perspective view of a shroud that may be attached to the LV adaptor plate 210 of an example embodiment. FIG. 11 illustrates a detail perspective view of a hinge employed on the shroud in accordance with an example embodiment. FIG. 12 illustrates a perspective view of an example SV that does not include a shroud in accordance with an example embodiment. FIG. 13 illustrates an example SV in which a partial shroud is provided in accordance with an example embodiment.

In an example embodiment, an optional shroud 300 may be provided to protect the SV 110 during shipment to the launch site with the LV adaptor plate 210. In this regard, for example, the shroud 300, which may be provided with a door 310 that can be deployed by command, protects the SV 110 from EMI/EMC effects, thermal effects from radiation or mass impingement, acoustic energy, contamination, and with tamper-proofing that would conventionally allow commercial, civil, or Government missions to be launched on a foreign launch vehicle without fear of compromising ITAR issues or OPSEC guidelines. The shroud 300 may also protect a primary payload (if this system is used for a secondary or tertiary payload) from contact with the SV 110 contained in the shroud 300.

The shroud 300 may be attached to the LV adaptor plate 210 around peripheral edges thereof, or may be affixed to the surface of the LV adaptor plate 210 (e.g., the surface that faces toward the SV separation plate 200). In some cases, the shroud 300 may include a removable cover or covers to provide access to propulsion system service valves or various other components of the SV 110. The service valves may be used to pressurize or depressurize a propellant tank and either load or off-load the propellant during field operations.

In some embodiments, the shroud 300 may be a partial shroud (e.g., see partial shroud 302 of FIG. 13). In such an embodiment, the SV 110 may be released and exit the partial shroud 302 without contacting the partial shroud 302. However, in other embodiments, the shroud 300 may fully enclose the payload of the SV 110. In such an embodiment, four sidewalls 320 may be provided so that the sidewalls 320 have substantially the same width as the corresponding lengths of the LV adaptor plate 210. The sidewalls 320 may therefore extend away from the edges of the LV adaptor plate 210 substantially perpendicular to the surface of the LV adaptor plate 210 that faces the SV separation plate 200. The sidewalls 320 may connect to each other along lateral edges thereof to form a continuous enclosure around the lateral sides of the SV 110.

In some cases where a full shroud (e.g., shroud 300 of FIG. 10) is employed, it may be advantageous or required to include the door 310 to facilitate opening of the door 310 to allow the SV 110 to exit the shroud 300. The door 310 may lie in a plane substantially parallel to the plane in which the LV adaptor plate 210 when the door 310 is closed over the SV 110. Thus, the door 310 may lie in a plane that is substantially perpendicular to the direction of extension of the sidewalls 320. In some embodiments, the door 310 may have similar length and width dimensions to that of the LV adaptor plate 210 (but may have a different thickness). Accordingly, the LV adaptor plate 210, in combination with the sidewalls 320 and the door 310 (when closed) may form a complete enclosure around the SV 110. The SV 110 may be connected to or built upon the SV separation plate 200 so that when the door 310 is opened and the separation nuts 220 are activated, the separation nuts 220 may release the SV separation plate 200 and the 240 to push the SV separation plate 200 away from the LV adaptor plate 210 with minimal tip off or twisting so that the SV 110 may pass through the opened door 310 and exit the shroud 300 during separation.

In one example embodiment, each of the sidewalls 320 may have a length of about 55 cm. One set of opposing sidewalls 320 may have widths of about 40 cm and the other set of opposing sidewalls 320 may have a width of about 41 cm. Thus, the shroud 300 may be defined as a rectangular prism having a longitudinal length of 55 cm and a base (e.g., defined on one side by the door 310 and on the other side by the LV adaptor plate 210) of about 40 cm by about 41 cm to enclose the SV 110 (e.g., a nanosatellite) within the shroud 300.

In an example embodiment, a hinge 330 may be provided to operably couple the door 310 to one of the sidewalls 320 at a distal end of the corresponding one of the sidewalls 320 (relative to the LV adaptor plate 210). The hinge 330, which is shown in more detail in FIG. 11, may include biasing elements 332 (e.g., springs) configured to bias the door 310 to open. In some embodiments, the biasing elements 332 may be configured to provide sufficient force to push the door 310 open at least 90 degrees (and may be as many as 270 degrees to reduce possibility of re-contact between the SV 110 and the shroud 300) so that the door 310 is cleared out of the way of the SV separation plate 200 and the SV 110 when separation is conducted. In such an example, an actuator 340 may be provided on the door 310 at an opposite side thereof relative to the hinge 330. The actuator 340 may be configured to hold the door 310 shut until actuated, at which time the door 310 may be released so that the biasing elements 332 are free to act to open the door 310.

Accordingly, in some embodiments, the shroud 300 may provide for improved security and safety of the SV prior to release. The improved safety and security may relate to environmental, electromagnetic interference (EMI), thermal, acoustic, mechanical, physical, and visual inspection protection. Thus, for example, the shroud 300 may in some cases further provide EMI/EMC protection features. In such an example, the shroud 300 may act as a Faraday cage when the door 310 is in the closed position. The shroud 300 may have intimate electrical contact to the LV adaptor plate 210 and each of the 4 walls of the shroud 300 may have intimate electrical contact between each other. The door 310 of the shroud 300 may have intimate electrical contact to the rest of the shroud 300 by virtue of an EMI gasket affixed to the door 310 around a periphery thereof.

In an example embodiment, actuation of the actuator 340 may be timed relative to release of the SV separation plate 200 so that the door 310 is ensured to be open when the SV separation plate 200 is separated from the LV adaptor plate 210. Thus, for example, timing of the actuation of the actuator 340 may be coordinated with operation of the separation nuts 220 so that the SV 110 can be released from the shroud 300 without contacting any portion of the shroud 300 during separation. In some embodiments, the actuator 340 may include a pin that is pulled to release the door 310 responsive to actuation of the actuator 340. Thus, for example, the actuator 340 may form an assembly including one portion at the sidewall 320 and one portion at the door 310. In such an example, the pin may extend from the portion of the actuator 340 that is disposed at one of the sidewalls 320 into another portion of the actuator 340 disposed at the door 310 to hold the door shut against the pressure of the biasing elements 332. However, when the actuator 340 is actuated, the pin may withdraw so that the pressure exerted by the biasing elements 332 is no longer restrained, and the door 310 may be opened by the biasing elements 332 operating within the hinge 330. It should be appreciated that the locations of the pin and the portion of the actuator 340 that receives the pin may be switched in alternative embodiments. Thus, the pin may extend from the door 310 to the sidewall 320 or from the sidewall 320 to the door 310.

Conventional adaptor systems tend to be very launch vehicle-specific, especially for different vehicle classes, such as Minotaur I and Falcon 9 Heavy. For example, ULA secondary accommodations differ from those on launch vehicles produced by SpaceX, Orbital and Ariane. The adaptor architecture of example embodiments described above may enable unification of primary, secondary, and tertiary rideshare opportunity interfaces throughout the industry. The same separation system and shrouds may therefore be used in conjunction with a small number of flat plate adaptors or existing ported ring adaptors with any domestic launch vehicles mentioned above as well as many international variants. The adaptor architecture of an example embodiment also allows a mixed topology between CubeSats, nanosatellites, ESPA, larger primary satellite payloads. Gaining access to ride-share or primary launch opportunities across a large fleet of launch vehicles and the potential for mixed topology missions may enable the industry to make opportunities for small payload launches much more prevalent across the industry.

A separation system designed according to an example embodiment may include several unique features. Most small satellites, particularly, nanosatellites and microsatellites, have utilized a ring-type separation system. Traditional ring-type separation systems require the SV to either feature a round structural element or to transition from a round element to a polygonal element since most nanosatellite or microsatellite structures are prismatic polygons (squares, rectangles, hexagons or octagons). Nano- and microsatellites are typically too volume constrained to have a center cylinder, so a very thick baseplate or a circle to polygon transition structure is often required. These transition structures are massive, and reduce the available volume for electronics packages. Additionally, mechanical loads in SV structures tend to concentrate along the corners where panels are joined.

Utilizing a flat plate dispenser (e.g., the SV separation plate 200) in accordance with an example embodiment may put the hard points between the SV and the LV right at the corners, eliminating the need to build a rigid structure which would react loads between the corners and a circular shape of a traditional ring-type separation system. By integrating either a single or two-bolt, two-snubber system into the bottom deck of the space vehicle, mass may be minimized while packaging volume is maximized. The separation system of an example embodiment may therefore utilize a lower number (e.g., one or two high-reliability separation nuts) of releasable components in combination with snubbers. Although they are not required sources, High Shear Technology Corporation, Sierra Nevada Corporation, Cooper Industries, Ensign Bickford all produce release devices which have the load capacity, reliability and low shock generation properties necessary for employment in connection with example embodiments (e.g., for the separation nuts 220).

By minimizing parts count and greatly simplifying the design of the system, reliability, cost, and mass are optimized. Several large (>1000 lbm) satellites have used systems with multiple separation nuts, but example embodiments may only use one or two. By using multiple snubbers, actuator count and resulting complexity and cost are also reduced, even while system reliability is increased. The spherical snubbers are insensitive to angular alignment, which is a great advantage when mating the SV 110 to the separation system. The spherical snubbers on the SV 110 can be adjusted in their mounting plane and normal to it while the SV 110 is mated to the separation system, which speeds mate-for-flight operations and allows the mating preload to be adjustable. Unlike traditional-ring type separation systems (and traditional multi-point bolted separation systems), the flat plate dispenser system of an example embodiment may allow for differential thermal expansion between the LV 100 and the SV 110 by having one of the convex sphere snubbers mated to a U-channel snubber oriented diagonally across the separation system. In such an example, the U-channel snubber reacts load perpendicular to the long axis, but not parallel to the long axis. The flat plate separation system of an example embodiment may drastically simplify Mate-for-flight operations, which may include snubber location adjustment and fastener torquing, installing bolts into the separation nuts, and installing bolt extractor covers. When compared to installation procedures for traditional ring-type separation systems, the installation procedure is relatively simple. When manufacturing costs are compared between clamp-band-type separation systems and a flat plate separation system, the flat plate separation system of an example embodiment may be a lowest cost option.

Example embodiments may therefore provide a scalable flat plate adaptor system that is useable in connection with a plurality of different launch vehicles to enable release of the space vehicle from the launch vehicle in multiple orientations and with tunable relative velocity. By maximizing the scalability and reusability of the flat plate adaptor system described herein, rideshare opportunities may be maximized and cost may be minimized while still providing maximum space for payload(s) to be accommodated. Example embodiments may also provide a mechanism for positive deployment confirmation detection/feedback and an adaptor connector with provision for providing power and telemetry services to the SV from the LV either using a physical umbilical or wireless methods, e.g., the shroud may be configured to include an umbilical connection to facilitate positive deployment confirmation detection, or provide power and telemetry services to the space vehicle separation plate prior to separation of the space vehicle separation plate, where in one non-limiting example embodiment the umbilical function is provided either through a physical connection or wireless device. Some embodiments may also provide a shroud capable of supporting and maintaining a nitrogen purge environment (for cleanliness). Another example embodiment can also be used with launch systems on ballistic (non-orbital) trajectories. Thus, for example, payloads/vehicles for Earth atmosphere re-entry/termination may be provided.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An adaptor system comprising:
 a space vehicle separation plate operably coupled to a space vehicle;
 a launch vehicle adaptor plate operably coupled to a launch vehicle capable of carrying the space vehicle into space or into a ballistic trajectory;
 an actuator-release mechanism assembly configured to separably couple the space vehicle separation plate to the launch vehicle adaptor plate, the actuator-release mechanism assembly passing through the launch vehicle adaptor plate to engage the space vehicle separation plate to hold the space vehicle separation plate substantially parallel to the launch vehicle adaptor plate prior to release of the space vehicle separation plate;
 a restraint assembly configured to employ axial adjustments while releasably coupling the space vehicle separation plate to the launch vehicle adaptor plate; and
 a biasing element assembly configured to provide a force normal to a surface of the launch vehicle adaptor plate to separate the space vehicle separation plate from the launch vehicle adaptor plate when the actuator-release mechanism assembly is triggered to release the space vehicle separation plate from the launch vehicle adaptor plate.

2. The adaptor system of claim 1, wherein the biasing element assembly comprises a separation spring including a support rod biased by a spring, the separation spring extending normal to the surface of the launch vehicle adaptor plate such that at least a portion of the separation spring passes through a portion of the launch vehicle adaptor plate.

3. The adaptor system of claim 2, wherein the biasing element assembly comprises a plurality of biasing elements distributed evenly spaced apart from each other relative to a surface of the launch vehicle adaptor plate.

4. The adaptor system of claim 3, wherein the space vehicle separation plate and launch vehicle adaptor plate support an umbilical connection to facilitate positive deployment confirmation detection, the umbilical connection being provided either through a physical connection or wireless device.

5. The adaptor system of claim 3, wherein the separation springs are tunable for different separation velocities and tip-off rates.

6. The adaptor system of claim 1, wherein the actuator-release mechanism assembly comprises at least one separation nut provided at the launch vehicle adaptor plate, at least one separation nut being configured to release a separation bolt coupled to the space vehicle separation plate responsive to triggering of the actuator-release mechanism assembly to release the space vehicle separation plate from the launch vehicle adaptor plate.

7. The adaptor system of claim 1, wherein the launch vehicle adaptor plate supports an umbilical configured to provide power and telemetry services to the space vehicle separation plate prior to separation of the space vehicle separation plate, the umbilical function being provided either through a physical connection or wireless device.

8. The adaptor system of claim 1, wherein the restraint assembly comprises a socket disposed in a surface of the launch vehicle adaptor plate and a spherical snubber disposed to extend from a surface of the space vehicle separation plate to be received in the socket.

9. The adaptor system of claim 1, wherein the restraint assembly comprises at least two spherical snubbers disposed proximate to opposite corners of the space vehicle separation plate.

10. The adaptor system of claim 9, wherein the actuator-release mechanism assembly comprises at least two separation nuts provided at the launch vehicle adaptor plate, at least two separation nuts being configured to release two corresponding separation bolts coupled to the space vehicle separation plate responsive to triggering of the actuator-release mechanism assembly to release the space vehicle separation plate from the launch vehicle adaptor plate, at least two separation nuts being provided proximate to different opposite corners of the space vehicle separation plate than the opposite corners proximate to which the at least two spherical snubbers are provided, and wherein the biasing element assembly comprises four separation springs, each of which is provided proximate to a respective one of the at least two separation nuts and at least two spherical snubbers, the separation springs each including a support rod biased by a spring, the separation springs each extending normal to the surface of the launch vehicle adaptor plate such that at least a portion of each of the separation springs passes through a portion of the launch vehicle adaptor plate.

11. The adaptor system of claim 10, wherein the two separation nuts are timed for simultaneous actuation when the actuator-release mechanism assembly is triggered to release the space vehicle separation plate from the launch vehicle adaptor plate.

12. The adaptor system of claim 1, further comprising a shroud configured to at least partially enclose the space vehicle and provide environmental, electromagnetic interference, thermal, acoustic, mechanical, physical, and visual inspection protection.

13. The adaptor system of claim 12, wherein the shroud comprises sidewalls coupled to respective edges of the launch vehicle adaptor plate and extending substantially perpendicular to a surface of the launch vehicle adaptor plate that faces the space vehicle separation plate prior to release of the space vehicle separation plate from the launch vehicle adaptor plate.

14. The adaptor system of claim 13, wherein the shroud is open at least on one side.

15. The adaptor system of claim 13, wherein the sidewalls enclose all sides of the space vehicle.

16. The adaptor system of claim 15, wherein the shroud further comprises a door disposed in a plane substantially perpendicular to the sidewalls and substantially parallel to a plane in which the launch vehicle adaptor plate lies.

17. The adaptor system of claim 16, wherein the door is coupled to one of the sidewalls via a hinge and wherein an actuator is provided at one of the sidewalls opposite the hinge to release the door.

18. The adaptor system of claim 17, wherein the hinge is biased to open the door responsive to actuation of the actuator.

19. The adaptor system of claim 18, wherein the actuator is timed for actuation relative to triggering release of the space vehicle separation plate from the launch vehicle adaptor plate.

* * * * *